United States Patent
Dor et al.

(10) Patent No.: US 8,780,941 B2
(45) Date of Patent: Jul. 15, 2014

(54) MMSE METHOD AND SYSTEM

(75) Inventors: Avner Dor, Kfar Saba (IL); Assaf Touboul, Natanya (IL); Oz Barak, Hod Hasharon (IL)

(73) Assignee: Qualcomm Incorporated, San Diego, CA (US)

( * ) Notice: Subject to any disclaimer, the term of this patent is extended or adjusted under 35 U.S.C. 154(b) by 527 days.

(21) Appl. No.: 12/919,023

(22) PCT Filed: Jan. 8, 2009

(86) PCT No.: PCT/IL2009/000031
§ 371 (c)(1),
(2), (4) Date: Aug. 24, 2010

(87) PCT Pub. No.: WO2009/087629
PCT Pub. Date: Jul. 16, 2009

(65) Prior Publication Data
US 2011/0019696 A1    Jan. 27, 2011

Related U.S. Application Data

(60) Provisional application No. 61/019,615, filed on Jan. 8, 2008.

(51) Int. Cl.
*H04J 1/00* (2006.01)
*H04L 5/06* (2006.01)

(52) U.S. Cl.
CPC ........................................ *H04L 5/06* (2013.01)
USPC ........................................................ 370/480

(58) Field of Classification Search
CPC ........................................................ H04L 5/06
USPC ........... 370/480; 375/260, 262, 265, 267, 340
See application file for complete search history.

(56) References Cited

U.S. PATENT DOCUMENTS

| | | | |
|---|---|---|---|
| 8,194,768 B1* | 6/2012 | Lee et al. | 375/261 |
| 2005/0128953 A1* | 6/2005 | Wallace et al. | 370/241 |
| 2007/0071147 A1* | 3/2007 | Sampath et al. | 375/347 |
| 2007/0211827 A1 | 9/2007 | Baggen et al. | |
| 2008/0031370 A1* | 2/2008 | Guey et al. | 375/260 |
| 2008/0112381 A1* | 5/2008 | Shim et al. | 370/342 |
| 2008/0240262 A1* | 10/2008 | Wong | 375/260 |
| 2009/0060063 A1* | 3/2009 | Guey | 375/260 |
| 2009/0175367 A1 | 7/2009 | Kishigami et al. | |
| 2011/0194650 A1* | 8/2011 | Lee et al. | 375/316 |
| 2012/0275536 A1* | 11/2012 | Khojastepour et al. | 375/267 |

FOREIGN PATENT DOCUMENTS

WO    WO-2007078001 A1    7/2007

OTHER PUBLICATIONS

PCT/ISA/US, Declaration of Non-establishment of International Search Report and Written Opinion of the International Searching Authority, Int'l App. No. PCT/IL2009/00031, May 26, 2009, 4 pgs.
EPO, Supplementary European Search Report, EP App. No. 09700637.3, Feb. 18, 2013, 7 pgs.
Ozdemir et al., Channel Estimation for Wireless OFDM Systems, IEEE Communications Surveys & Tutorials, Apr. 1, 2007, vol. 9, No. 2, New York, NY, US, 31 pgs.

\* cited by examiner

*Primary Examiner* — Mark Rinehart
*Assistant Examiner* — Christopher R Crompton

(57) ABSTRACT

Methods and apparatus for reducing complexity of MMSE computations in a receiver are disclosed. According to these methods and apparatus, a first MMSE matrix is computed for a first sub-carrier in a pre-defined group of sub-carriers of a received transmission frame at a receiver. The first MMSE is based on a pilot signal of the first sub-carrier. The first MMSE matrix may then be phase shifted to compute a second MMSE matrix for a second sub-carrier in the group, the phase shifting based on a variation in column and row between the pilot signal of the first sub-carrier and a symbol of the second sub-carrier of the transmission frame.

18 Claims, 1 Drawing Sheet

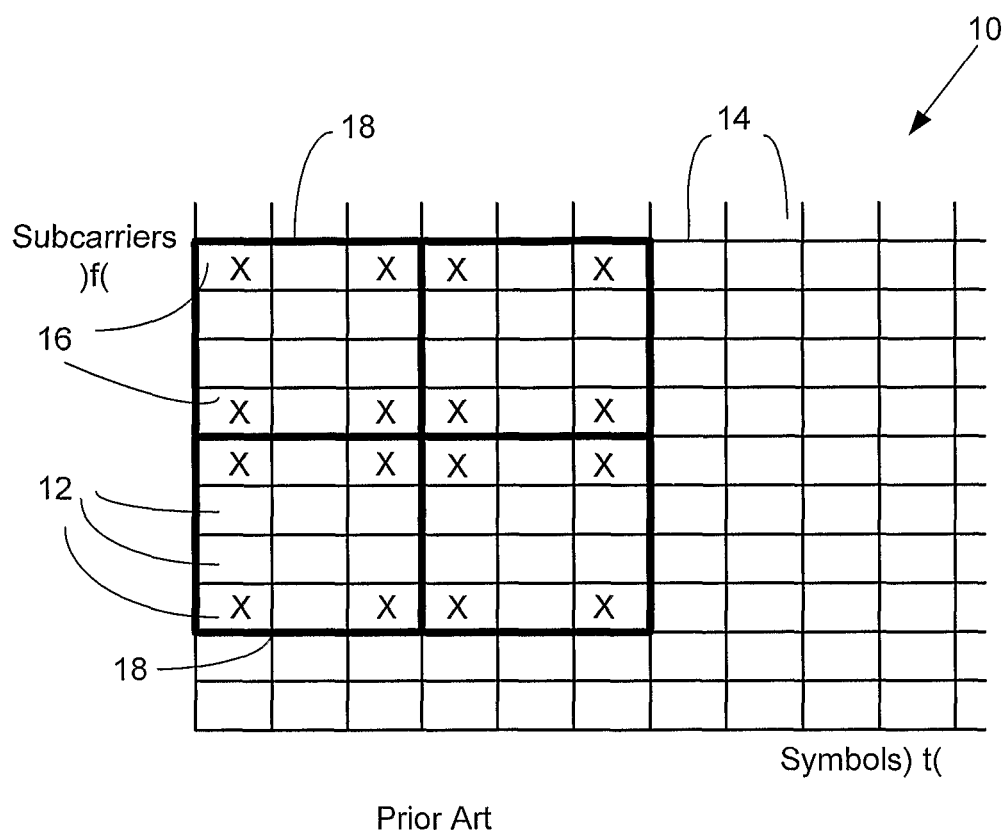
Prior Art

MMSE METHOD AND SYSTEM

FIELD OF THE INVENTION

The present invention relates to MMSE (Minimum Mean Squared Error) computations in OFDM (Orthogonal Frequency Division Multiplexing) wireless communications systems using MIMO (Multiple In Multiple Out) transmissions over a plurality of antennas.

BACKGROUND OF THE INVENTION

In wireless communications networks, the MMSE algorithm may be used to reduce the effect of interference between MIMO antenna streams. When using OFDM/OFDMA (Orthogonal Frequency Division Multiplexing/Orthogonal Frequency Division Multiple Access) in WiMAX transmissions, each frame 10 is divided into a plurality of sub-carriers 12, defined by frequency and symbols over time 14, as shown schematically in FIG. 1. In order to estimate the channel for purposes of data processing, pilot signals 16 are transmitted together with the data. Since both receiver and transmitter know the pilot signal, the channel can be estimated and the estimation can be used to reduce interference for the received data.

One example of a group of sub-carriers in a frame is a WiMAX tile 18, a unit formed of three symbols by four subcarriers, typically with one pilot in each corner of the tile.

In WiMAX tiles, channel variations are typically phase shifts per column combined with phase shifts per row—that is, a combination of time related and frequency related phase-shifts. In conventional methods, the MMSE calculation is performed in the receiver several times, once for each pilot of each tile, involving a substantial computational cost. As bandwidth increases, the number of tiles increases and the quantity of computations increases still further.

Accordingly, there is a long felt need for a method of reducing the complexity of MMSE computations per group of sub-carriers, that provides satisfactory results but requires substantially fewer computations than the conventional channel estimation method.

SUMMARY OF THE INVENTION

The present invention relates to a method that significantly reduces MMSE calculations in the receiver, while providing mitigation of interference as provided by conventional MMSE methods.

The present invention substantially reduces MMSE complexity for any given, moderate sized time×frequency rectangle of OFDM/A sub-carriers (e.g., a few consecutive or adjacent WiMAX tiles) comprising data and pilots sub-carriers, whenever the size of this rectangle is small enough that channel variations within the rectangle are phase shifts per column combined with phase shifts per row. The present invention provides a method by which an MMSE matrix V is computed once per pre-defined group of sub-carriers, preferably such a rectangle, and then the sub-carrier MMSE matrix for any other sub-carrier in that group is computed by phase shifts per column combined with phase shifts per row at V, which corresponds to the column/row phase shifts of the respective channel.

That is, instead of computing an MMSE matrix a number of times per group of sub-carriers, one MMSE matrix is computed per group and phase shifts are carried out per sub-carrier. In practice, when utilizing the method of the invention, only about a few percent of the original MMSE related computations are required.

For purposes of the present invention, the pre-defined group of sub-carriers can be any selected group of adjacent or consecutive sub-carriers. Thus, the group can be one WiMAX tile, several adjacent WiMAX tiles, an LTE resource block, or any other pre-defined group.

DETAILED DESCRIPTION OF THE INVENTION

An effective reduction of the effects of interference between MIMO streams can be achieved by the computation of an MMSE matrix for each tone (i.e., subcarrier). According to the present invention, the MMSE calculation is performed for only one tone in each pre-defined group of sub-carriers. The MMSE calculation in a receiver for a single tone is as follows.

Take an N×M complex channel matrix $H = (h_{ij})_{i=1,\ldots,N, j=1,\ldots,M}$ of one sub-carrier in a pre-defined group of sub-carriers. The corresponding N×M MMSE matrix is given by:

$$V_H = H \cdot (H^*H + \sigma^2 \cdot I)^{-1}.$$

where $\sigma^2$ is the noise variance and I is the M×M unit matrix.

Instead of performing the complete MMSE computation on other tones of the chosen group, it is sufficient to proceed with much simpler and fewer computations, as follows. Consider another subcarrier in that group. There are complex scalars that represent the phase-shifts with respect to that subcarrier, $e_1, e_2, \ldots e_M, f_1, f_2, \ldots f_N$ satisfying $|e_j|=1, |f_i|=1$ (j=1, ..., M, i=1, ..., N) for which the channel matrix that corresponds to that subcarrier is given by:

$$G = (f_i \cdot h_{ij} \cdot e_j)_{i=1,\ldots,N, j=1,\ldots,M}.$$

That is, G is formed by combined "phase-shift" of H columns and rows. This relationship between channel matrix H and G can be expressed in the following form. Define the unitary diagonal matrices E & F that represent the phase shifts:

$$E = \mathrm{diag}(e_1, e_2, \ldots e_M)$$

$$F = \mathrm{diag}(f_1, f_2, \ldots f_N).$$

The channel matrix G can thus be expressed by:

$$F \cdot H \cdot E = (f_i \cdot h_{ij} \cdot e_j)_{i=1,\ldots,N, j=1,\ldots,M} = G.$$

Since E and F are unitary, the following general proposition would be applicable:

Proposition.

If U is any M×M unitary and V is any N×N unitary, then $$V_{V \cdot H \cdot U} = V \cdot V_H \cdot U.$$

Proof.

$$\begin{aligned}
V_{V \cdot H \cdot U} &= (V \cdot H \cdot U) \cdot ((V \cdot H \cdot U)^*(V \cdot H \cdot U) + \sigma^2 \cdot I)^{-1} \\
&= (V \cdot H \cdot U) \cdot (U^* \cdot H^* \cdot V^* \cdot V H \cdot U + \sigma^2 \cdot I)^{-1} \\
&= (V \cdot H \cdot U) \cdot (U^* \cdot (H \cdot H + \sigma^2 \cdot I) \cdot U)^{-1} \\
&= (V \cdot H \cdot U) \cdot (U^* \cdot (H \cdot H + \sigma^2 \cdot I)^{-1} \cdot U) \\
&= V \cdot H \cdot (H \cdot H + \sigma^2 \cdot I)^{-1} \cdot U = V \cdot V_H \cdot U \; \blacklozenge
\end{aligned}$$

Thereby, since E and F are unitary, it holds that:

$$V_{F \cdot H \cdot E} = F \cdot V_H \cdot E.$$

In practice, in each such selected group, once the MMSE matrix, $V_H$, of one sub-carrier with a channel H, is computed, then for any other subcarriers in this group, the corresponding channel is G=F·H·E and, hence, the computation of its MMSE matrix, $V_{F \cdot H \cdot E}$, can be done by the above simple and low complexity phase-shift form:

$$V_{F \cdot H \cdot E} = F \cdot V_H \cdot E = (f_i \cdot [V_H]_{ij} \cdot e_j)_{i=1,\ldots,N; j=1,\ldots,M}$$

in which $e_j$ multiplies (i.e. phase shift) the j-column and $f_i$ the i-row of $V_H$.

It will be appreciated that the above method can be adapted by those skilled in the art for use in LTE, performing one MMSE computation for each resource block or other pre-defined group of sub-carriers.

It will be appreciated that many variations, modifications and other applications of the invention may be made.

The invention claimed is:

1. A method of computing Minimum Mean Squared Error (MMSE) matrices to reduce interference between multiple input multiple output (MIMO) streams in a wireless network, the method comprising:
    computing, by a receiver, a first MMSE matrix for a first sub-carrier in a pre-defined group of sub-carriers in a received Orthogonal Frequency Division Multiplexing/Orthogonal Frequency Division Multiple Access (OFDM/OFDMA) transmission frame, said first MMSE matrix based on a pilot signal of said first sub-carrier; and
    phase-shifting said computed first MMSE matrix at said receiver to compute a second MMSE matrix for a second sub-carrier in said predefined group of sub-carriers, said phase shifting based on a variation in column and row between said pilot signal of said first sub-carrier and a symbol of said second sub-carrier of said transmission frame.

2. The method according to claim 1, wherein said phase shifting said computed first MMSE matrix to compute said second MMSE matrix is performed as:

$$V_{F \cdot H \cdot E} = F \cdot V_H \cdot E = (f_i \cdot [V_H]_{ij} \cdot e_j)_{i=1,\ldots,N; j=1,\ldots,M}$$

in which $V_H$ is said first MMSE matrix of size N×M; $V_{F \cdot H \cdot E}$ is said second MMSE matrix of size N×M; $e_1, e_2, \ldots e_M$, $f_1, f_2, \ldots f_N$ are scalars that represent said phase shifting; E=diag($e_1, e_2, \ldots e_M$), and F=diag($f_1, f_2, \ldots f_N$).

3. The method according to claim 2, wherein $e_1, e_2, \ldots e_M$, and $f_1, f_2, \ldots f_N$ comprise complex scalars.

4. The method according to claim 2, wherein $|e_j|=1$ for j=1, ..., M, and $|f_i|=1$ for i=1, ..., N.

5. The method according to claim 1, further comprising:
    determining a per-column phase shift associated with said transmission frame; and
    determining a per-row phase shift associated with said transmission frame;
    wherein said phase shifting is further based on said per-column phase shift and said per-row phase shift.

6. The method according to claim 1, further comprising:
    performing one MMSE calculation for the transmission frame to compute said first MMSE matrix; and
    computing at least one separate MMSE matrix for a plurality of other subcarriers of said transmission frame by phase shifting said computed first MMSE matrix.

7. The method according to claim 6, further comprising:
    computing at least one separate MMSE matrix for each of other the subcarriers of said transmission frame by phase shifting said computed first MMSE matrix.

8. The method according to claim 1, wherein said transmission frame comprises an LTE resource block.

9. The method according to claim 1, wherein said transmission frame comprises a WiMAX tile.

10. An apparatus for computing Minimum Mean Squared Error (MMSE) matrices to reduce interference between multiple input multiple output (MIMO) streams, comprising:
    means for computing a first MMSE matrix for a first sub-carrier in a pre-defined group of subcarriers in a received Orthogonal Frequency Division Multiplexing/Orthogonal Frequency Division Multiple Access (OFDM/OFDMA) transmission frame, said first MMSE matrix based on a pilot signal of said first sub-carrier; and
    means for phase-shifting said computed first MMSE matrix to compute a second MMSE matrix for a second sub-carrier in said pre-defined group of subcarriers, said phase-shifting based on a variation in column and row between said pilot signal of said first sub-carrier and a symbol of said second sub-carrier of said transmission frame.

11. The apparatus according to claim 10, wherein said phase shifting said computed first MMSE matrix to compute said second MMSE matrix is performed as:

$$V_{F \cdot H \cdot E} = F \cdot V_H \cdot E = (f_i \cdot [V_H]_{ij} \cdot e_j)_{i=1,\ldots,N; j=1,\ldots,M}$$

in which $V_H$ is said first MMSE matrix of size N×M; $V_{F \cdot H \cdot E}$ is said second MMSE matrix of size N×M; $e_1, e_2, \ldots e_M$, $f_1, f_2, \ldots f_N$ are scalars that represent said phase shifting; E=diag($e_1, e_2, \ldots e_M$), and F=diag($f_1, f_2, \ldots f_N$).

12. The apparatus according to claim 11, wherein $e_1, e_2, \ldots e_M$, and $f_1, f_2, \ldots f_N$ comprise complex scalars.

13. The apparatus to claim 11, wherein $|e_j|=1$ for j=1, ..., M, and $|f_i|=1$ for i=1, ..., N.

14. The apparatus according to claim 10, further comprising:
    means for determining a per-column phase shift associated with said transmission frame; and
    means for determining a per-row phase shift associated with said transmission frame;
    wherein said phase shifting is further based on said per-column phase shift and said per-row phase shift.

15. The apparatus according to claim 10, further comprising:
    means for performing one MMSE calculation for the transmission frame to compute said first MMSE matrix; and
    means for computing at least one separate MMSE matrix for a plurality of other subcarriers of said transmission frame by phase shifting said computed first MMSE matrix.

16. The apparatus according to claim 15, further comprising:
    means for computing at least one separate MMSE matrix for each of other the subcarriers of said transmission frame by phase shifting said computed first MMSE matrix.

17. The apparatus according to claim 10, wherein said transmission frame comprises an LTE resource block.

18. The apparatus according to claim 10, wherein said transmission frame comprises a WiMAX tile.

* * * * *